(12) United States Patent
Numauchi et al.

(10) Patent No.: US 10,717,269 B2
(45) Date of Patent: Jul. 21, 2020

(54) PRINT QUALITY EXAMINATION DEVICE

(71) Applicants: KOMORI CORPORATION, Tokyo (JP); GLORY LTD., Himeji-shi, Hyogo (JP)

(72) Inventors: Hiromitsu Numauchi, Tsukuba (JP); Takashi Suto, Tsukuba (JP); Sayuri Yanagiuchi, Himeji (JP); Ryuzo Tanigawa, Himeji (JP)

(73) Assignees: KOMORI CORPORATION, Tokyo (JP); GLORY LTD., Hyogo (JP)

( * ) Notice: Subject to any disclaimer, the term of this patent is extended or adjusted under 35 U.S.C. 154(b) by 0 days.

(21) Appl. No.: 16/315,446

(22) PCT Filed: Jul. 12, 2017

(86) PCT No.: PCT/JP2017/025344
§ 371 (c)(1),
(2) Date: Jan. 4, 2019

(87) PCT Pub. No.: WO2018/012518
PCT Pub. Date: Jan. 18, 2018

(65) Prior Publication Data
US 2019/0224963 A1    Jul. 25, 2019

(30) Foreign Application Priority Data
Jul. 13, 2016   (JP) .................. 2016-138495

(51) Int. Cl.
*G01N 21/86* (2006.01)
*B41F 33/00* (2006.01)
(Continued)

(52) U.S. Cl.
CPC .......... *B41F 33/0036* (2013.01); *B41F 13/00* (2013.01); *B41F 33/00* (2013.01);
(Continued)

(58) Field of Classification Search
CPC ...... B41F 33/0036; B41F 13/00; B41F 33/00; B41F 13/0024; B41M 3/14; G01N 21/86; G01N 21/88; G01N 21/8806
(Continued)

(56) References Cited

U.S. PATENT DOCUMENTS 7,826,048 B2 * 11/2010 Holecek ............. G03G 15/0812
356/237.2
8,789,949 B2 * 7/2014 Kato .................... A61B 3/1005
351/206
(Continued)

FOREIGN PATENT DOCUMENTS

DE   10 2007 007 828 A1   8/2008
EP    2 397 840 A2        12/2011
(Continued)

OTHER PUBLICATIONS

International Search Report for PCT/JP2017/025344 (PCT/ISA/210) dated Sep. 19, 2017.
(Continued)

*Primary Examiner* — Roy M Punnoose
(74) *Attorney, Agent, or Firm* — Birch Stewart Kolasch & Birch LLP.

(57) ABSTRACT

A print quality examination device is provided in a printing machine (1) provided with a printing unit (3) that performs printing on a mirror-reflection member (5a) of a sheet (5) to which the mirror-reflection member (5a) is added. The print quality examination device of the printing machine is provided with an examination camera (18a) that images a picture printed on the sheet (5), a light source (18h) that irradiates the sheet (5) with light, and a print quality examination unit (18g) that examines the quality of the picture printed by the printing unit (3) based on image data imaged by the examination camera (18a). The examination camera (18a) or the light source (18h) is configured to be movably (Continued)

supported on an arc about a detection point (P) imaged by the examination camera (18a) for the sheet (5).

3 Claims, 11 Drawing Sheets

(51) Int. Cl.
*B41M 3/14* (2006.01)
*G01N 21/88* (2006.01)
*B41F 13/00* (2006.01)

(52) U.S. Cl.
CPC .............. *B41M 3/14* (2013.01); *G01N 21/88* (2013.01); *G01N 21/8806* (2013.01); *B41F 13/0024* (2013.01)

(58) Field of Classification Search
USPC ......................................................... 356/445
See application file for complete search history.

(56) References Cited

U.S. PATENT DOCUMENTS

| | | | |
|---|---|---|---|
| 9,170,206 B2* | 10/2015 | Ohama | B41F 33/0036 |
| 2005/0174571 A1* | 8/2005 | Cochran | G01N 21/8806 |
| | | | 356/240.1 |
| 2006/0033922 A1 | 2/2006 | Sperling et al. | |
| 2008/0162073 A1* | 7/2008 | Holecek | G01B 11/255 |
| | | | 702/150 |
| 2012/0160116 A1 | 6/2012 | Endo | |
| 2013/0278898 A1* | 10/2013 | Kato | A61B 3/1005 |
| | | | 351/208 |
| 2014/0022379 A1* | 1/2014 | Ohama | B41F 33/0036 |
| | | | 348/125 |
| 2014/0362377 A1* | 12/2014 | Hegstrom | G01N 21/474 |
| | | | 356/343 |
| 2017/0010211 A1* | 1/2017 | Ohama | G01N 21/8903 |

FOREIGN PATENT DOCUMENTS

| | | |
|---|---|---|
| JP | H10-206338 A | 8/1998 |
| JP | 2008-164628 A | 7/2008 |
| JP | 2012-2601 A | 1/2012 |
| JP | 2012-135885 A | 7/2012 |
| JP | 2012-240375 A | 12/2012 |
| JP | 2015-104832 A | 6/2015 |
| WO | WO 2013/144078 A1 | 10/2013 |
| WO | WO 2015/079937 A1 | 6/2015 |

OTHER PUBLICATIONS

Extended European Search Report issued in counterpart European Application No. 17827645.7 dated Feb. 24, 2020.
Office Action dated Apr. 2, 2020 in counterpart Chinese Application No. 201780039214.1 with an English Translation.

* cited by examiner

PRINT QUALITY EXAMINATION DEVICE

TECHNICAL FIELD

The present invention relates to a printing-quality checking device for checking the printing quality of a pattern printed on a specular reflection member provided to a printed product.

BACKGROUND ART

Printing presses including a checking device for checking a pattern printed on a printed product have heretofore been known (see Patent Document 1 listed below, for example).

PRIOR ART DOCUMENT

Patent Document

Patent Document 1: Japanese Patent Application Publication No. 2012-135885

SUMMARY OF THE INVENTION

Problems to be Solved by the Invention

Here, for printed securities products such as bank notes, a specular reflection member such as a hologram or a security thread is often added to or processed in their surfaces as a protection against counterfeiting. When patterns are printed on the surface of such a printed securities product where a hologram, a security thread, or the like has been added to or processed in advance, patterns are printed also on the specular reflection member in some cases.

A problem with these cases is that, when a checking device checks the printing quality of the printed securities product, the specularly reflected light from the hologram or security thread portion is so intense that the diffuse-reflected light from the pattern portion printed thereon is unreadable and it is impossible to determine whether the patterns are printed correctly.

The present invention has been made to solve such a problem, and an object thereof is to provide a printing-quality checking device capable of accurately checking the quality of a pattern printed on the surface of a specular reflection member.

Means for Solving the Problem

A printing-quality checking device according to a first aspect of the invention for solving the above problem is a printing-quality checking device provided to a printing press including a printing unit that performs printing on a specular reflection member provided to a printed product, the printing-quality checking device including:

a light source that applies light to the printed product;

an imaging device that images a pattern printed on the printed product; and a printing-quality checking unit that checks quality of the pattern printed by the printing unit, based on image data captured by the imaging device, the printing-quality checking device characterized in that the imaging device or the light source is supported to be movable along an arc centered at a detection point on the printed product imaged by the imaging device.

A printing-quality checking device according to a second aspect of the invention for solving the above problem is characterized in that the printing-quality checking device further comprises:

a support member that supports the imaging device or the light source; and a guiding member that guides the support member along the arc.

A printing-quality checking device according to a third aspect of the invention for solving the above problem is characterized in that the support member includes a support plate which supports the imaging device or the light source, and guide members which are fixed to axially opposite sides of the support plate and to each of which two guide pins are fixed on a same arc centered at the detection point, the guiding member includes two guide plates each of which includes an arc-shaped guide hole centered at the detection point, and the imaging device or the light source moves along the arc centered at the detection point with the guide members and the support plate by allowing the guide pins to slide along the guide holes.

Effect of the Invention

According to the present invention, it is possible to accurately check the quality of a pattern printed on the surface of a specular reflection member.

MODES FOR CARRYING OUT THE INVENTION

First Embodiment

A first embodiment of a printing-quality checking device according to the present invention will now be described based on FIGS. 1 to 7 and FIGS. 8A and 8B.

Figure 1:
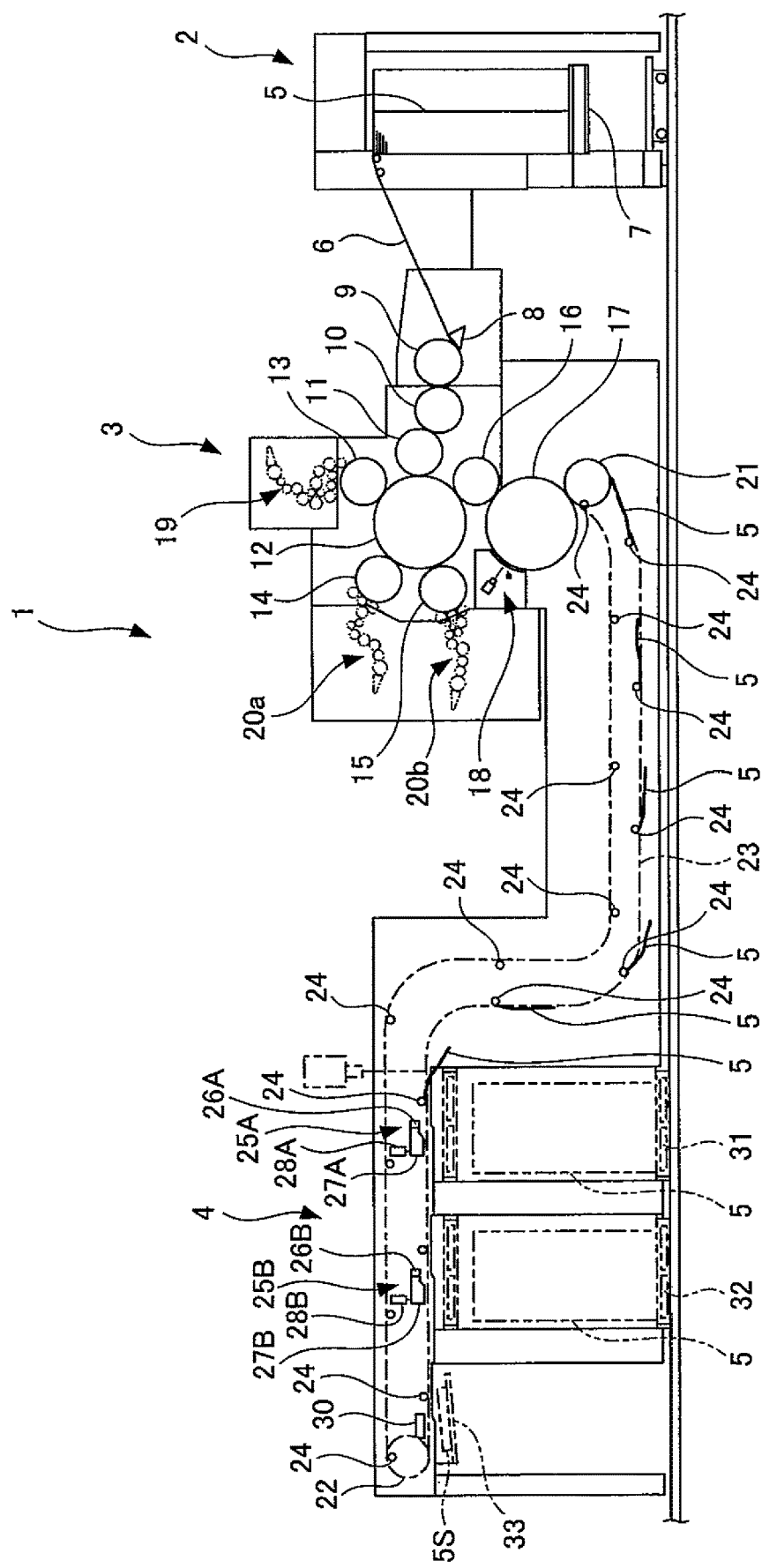
FIG. 1 is a side view illustrating the entirety of a numbering and imprinting machine according to a first embodiment of the present invention.

A numbering and imprinting machine whose entirety is illustrated in FIG. 1 with reference numeral 1 basically includes: a feeder 2 as a sheet feed unit that feeds sheets 5 onto a feeder board 6 one by one; a printing unit 3 that prints a seal and numbers onto fed sheets 5; and a delivery unit 4 as a sheet discharge unit that discharges printed sheets.

The feeder 2 is provided with a pile board 7 as a stack board on which to stack many sheets 5 after addition or processing of a specular reflection member 5a such as a hologram or a security thread by another printing press (see FIGS. 8A and 8B; hereinafter, simply referred to as "specular reflection member 5a"). The sheets 5 on the pile board 7 are sucked and fed onto the feeder board 6 one by one by a suction device not illustrated, and fed to the printing unit 3 by a swing arm shaft pregripper 8 through a transfer cylinder 9.

The printing unit 3 includes: an impression cylinder 12 that transports a sheet 5 received through two transfer cylinders 10, 11 and wound on the circumferential surface of the impression cylinder 12; a seal cylinder 13 that prints the seal onto the sheet 5 transported by this impression cylinder 12; first and second number cylinders 14, 15 that prints numbers onto the sheet 5 transported by the impression cylinder 12; a transfer cylinder 16 that is provided in contact with the impression cylinder 12 and transports the sheet received from the impression cylinder 12; a checking cylinder 17 that transports the sheet 5 received from this transfer cylinder 16 and wound on the circumferential surface of the checking cylinder 17; and a checking device 18 as a printing-quality checking device that checks the quality of the seal and numbers printed on the sheet 5 wound and transported on the circumferential surface of this checking cylinder 17.

Figure 2:
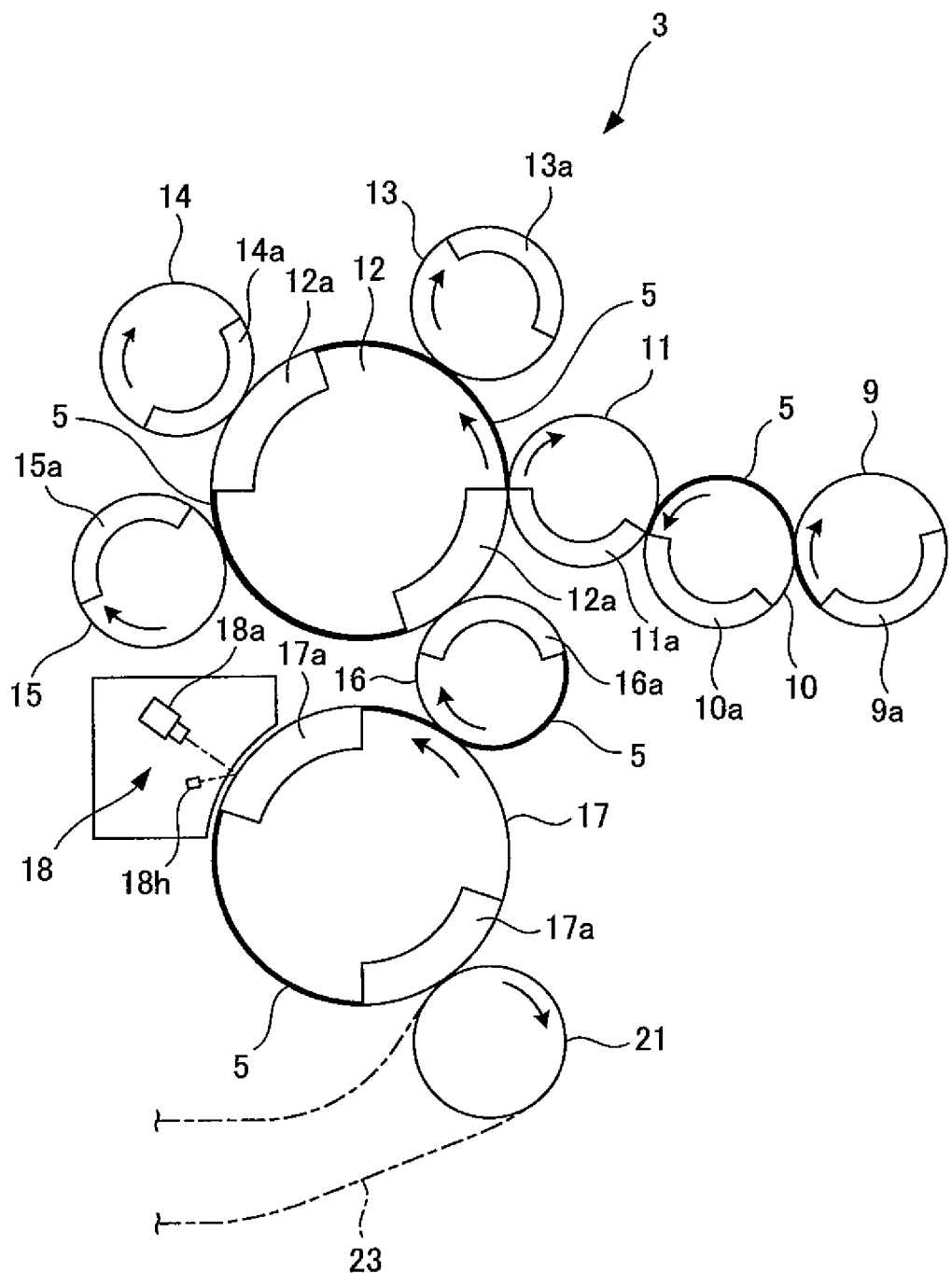
FIG. 2 is a side view illustrating a main part of the numbering and imprinting machine according to the first embodiment of the present invention.

As illustrated in FIG. 2, the circumferential surfaces of the transfer cylinders 9, 10, 11 are provided with gaps 9a, 10a, 11a, the gaps in the adjacent cylinders facing each other. The diameter of the impression cylinder 12 and the checking cylinder 17 is twice as large as the diameter of the seal cylinder 13 and the first and second number cylinders 14, 15. The circumferential surface of the impression cylinder 12 is provided with a pair of gaps 12a, 12a shifted from each in phase by 180° in the circumferential direction. The gap 11a in the transfer cylinder 11 faces these gaps 12a, 12a. The circumferential surfaces of the seal cylinder 13, the first and second number cylinders 14, 15, and the transfer cylinder 16 are provided with gaps 13a, 14a, 15a, 16a that face the gaps 12a, 12a. Among these, in the gaps 9a, 10a, 11a, 12a, 16a in the transfer cylinders 9, 10, 11, the impression cylinder 12, and the transfer cylinder 16, gripper devices not illustrated are provided as sheet holding devices that hold the forward edge (leading edge) of a sheet 5.

The first and second number cylinders 14, 15 are widely-known conventional cylinders including a plurality of numbering units in the circumferential direction on a rotation shaft not illustrated with a mount ring therebetween. The number cylinders 14, 15 are driven by a number shift mechanism provided at an end of the shaft, and the numbers are incremented each time the number cylinders 14, 15 rotate 360°. The circumferential surface of the checking cylinder 17 is provided with a pair of gaps 17a, 17a that are shifted from each other in phase by 180° in the circumferential direction and face the gap 16a in the transfer cylinder 16. Also, the circumferential surface of the checking cylinder 17 excluding the gaps 17a is provided with many suction holes (not illustrated), and a sheet 5 passed from the transfer cylinder 16 is transported in a sucked state on this circumferential surface of the checking cylinder 17. In the gaps 17a, 17a of this checking cylinder 17 too, gripper devices not illustrated are provided as sheet holding devices that hold the forward edge (leading edge) of a sheet 5.

The checking device 18 includes a checking camera 18a that images a sheet 5 wound on and transported by the checking cylinder 17, and a light source 18h that applies light toward the checking cylinder 17 (the sheet 5 imaged by the checking camera 18a). Based on the image captured by the checking camera 18a, the checking device 18 checks the condition of printing of the seal and numbers printed on the sheet 5 transported by the checking cylinder 17 and checks whether the printed numbers match the numbers that are supposed to be printed.

In FIG. 1, reference numeral 19 denotes an inker that includes an ink fountain and a group of many rollers and supplies ink to the seal cylinder 13. Reference numerals 20a, 20b denote inkers including ink fountains and groups of many rollers and supply ink to the first and second number cylinders 14, 15, respectively.

Reference numeral 21 denotes a delivery cylinder in contact with the checking cylinder 17. A pair of left and right delivery chains 23 are laid in a tensioned state between sprockets (not illustrated) provided coaxially with this delivery cylinder 21 and sprockets 22 provided at the end of the delivery unit 4. Delivery grippers 24 as a plurality of gripper bars are provided on gripper shafts supported at certain intervals between these left and right delivery chains 23. These delivery grippers 24 receive a sheet 5 gripped by a gripper device of the checking cylinder 17 in cooperation with the delivery cylinder 21 and transports the sheet 5 to the delivery unit 4 as the delivery chains 23 is run.

Reference numeral 25A denotes a first discharge-cam moving device provided above a first delivery pile 31, which is a first discharge pile, and includes a first delivery cam 27A as a first discharge cam supported on left and right delivery frames (not illustrated) so as to be pivotable about a shaft 26A, and an air cylinder 28A that moves this first delivery cam 27A to an advance position to which the first delivery cam 27A is caused to advance to be in the travel path for the delivery grippers 24 (the travel path for cam followers of the delivery grippers 24) and to a retreat position to which the first delivery cam 27A is caused to retreat from the travel path. In this configuration, with the air cylinder 28A driven to cause the first delivery cam 27A to advance into the travel path for the delivery grippers 24, the cam followers (not illustrated) of some delivery grippers 24 come into engagement with the first delivery cam 27A, so that the delivery grippers 24 release their grip and the sheets 5 are discharged onto the first delivery pile 31. On the other hand, with the air cylinder 28A driven to cause the first delivery cam 27A to retreat from the travel path for the delivery grippers 24, the cam followers (not illustrated) of the delivery grippers 24 do not come into engagement with the first delivery cam 27A, so that the delivery grippers 24 pass below the first delivery cam 27A while keeping gripping their sheets 5.

Reference numeral 25B denotes a second discharge-cam moving device provided downstream of the first discharge-cam moving device 25A in the direction of transport of sheets 5 and above a second delivery pile 32, which is a second discharge pile, and includes a second delivery cam 27B as a second discharge cam supported on left and right delivery frames (not illustrated) so as to be pivotable about a shaft 26B, and an air cylinder 28B that moves this second delivery cam 27B to an advance position to which the second delivery cam 27B is caused to advance to be in the travel path for the delivery grippers 24 (the travel path for the cam followers of the delivery grippers 24) and to a retreat position to which the second delivery cam 27B is caused to retreat from the travel path. In this configuration, with the air cylinder 28B driven to cause the second delivery cam 27B to advance into the travel path for the delivery grippers 24, the cam followers (not illustrated) of some delivery grippers 24 come into engagement the second delivery cam 27B, so that the delivery grippers 24 release their grip and the sheets 5 are discharged onto the second delivery pile 32. On the other hand, with the air cylinder 28B driven to cause the second delivery cam 27B to retreat from the travel path for the delivery grippers 24, the cam followers (not illustrated) of the delivery grippers 24 do not come into engagement with the second delivery cam 27B, so that the delivery grippers 24 pass below the second delivery cam 27B while keeping gripping their sheets 5.

Reference numeral 30 denotes a fixed cam provided downstream of the second delivery cam 27B in the direction of transport of sheets 5 and above a third delivery pile 33, which is a third discharge pile, and disposed so as to face the travel path for the delivery grippers 24 (the travel path for the cam followers of the delivery grippers 24). Then, with both the first and second delivery cams 27A, 27B caused to retreat from the travel path for the delivery grippers 24, some delivery grippers 24 pass under the first and second delivery cams 27A, 27B while keeping gripping their sheets 5, and their cam followers come into engagement with the fixed cam 30, so that the delivery grippers 24 release their grip and the sheets 5 are discharged onto the third delivery pile 33.

Here, the checking device 18 of the printing-quality checking device according to this embodiment is configured to enable adjustment of the imaging angle of the checking camera 18a about a center P of the range for imaging of a sheet 5 by the imaging camera 18a (hereinafter, the detection point) with respect to a normal line connecting the center of the checking cylinder 17 and the detection point P, while keeping the checking camera 18a in focus at the detection point P. In this way, it is possible to adjust the ratio between the intensity of specularly reflected light from the specular reflection member 5a and the intensity of diffuse-reflected light from the pattern portion (numbers in this embodiment) printed on the specular reflection member 5a in the image captured by the checking camera 18a.

Details of the checking device 18 in this embodiment will now be described using FIGS. 3 to 5.

Figure 3:
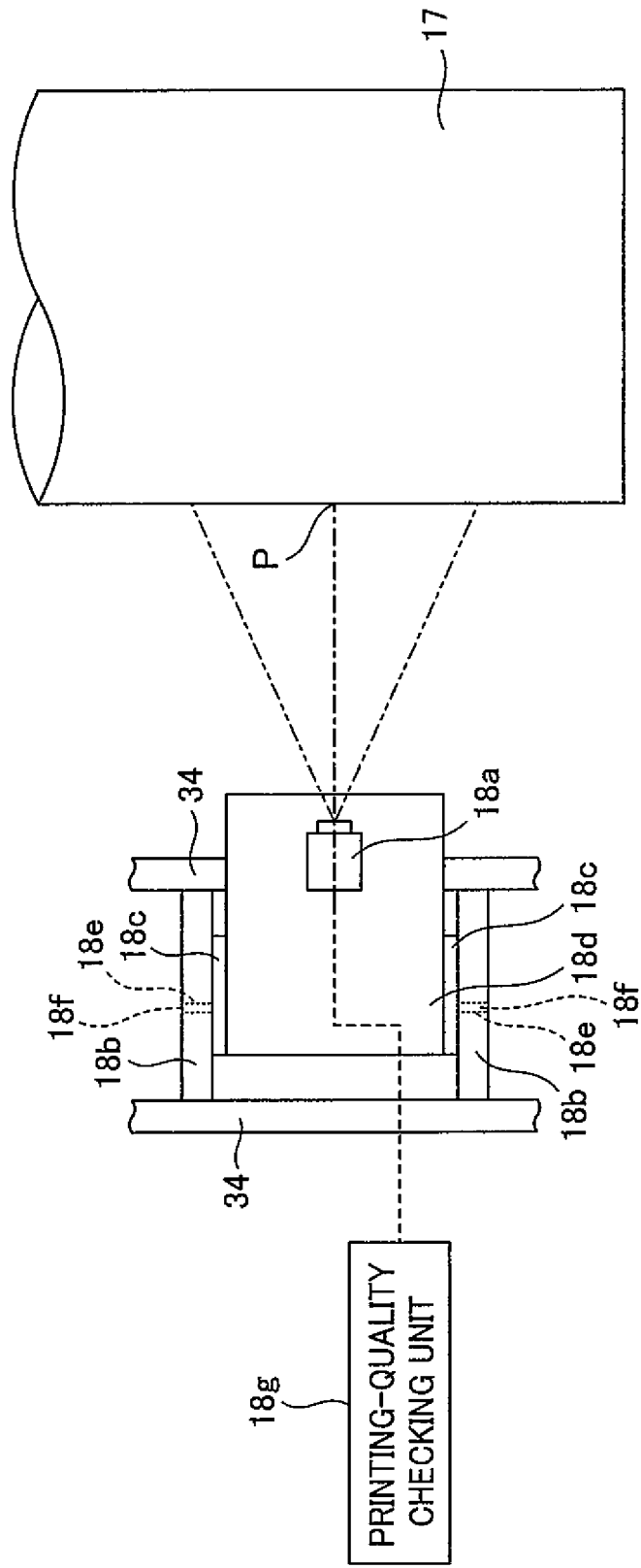
FIG. 3 is a top view illustrating a checking device according to the first embodiment of the present invention.
Figure 4A:
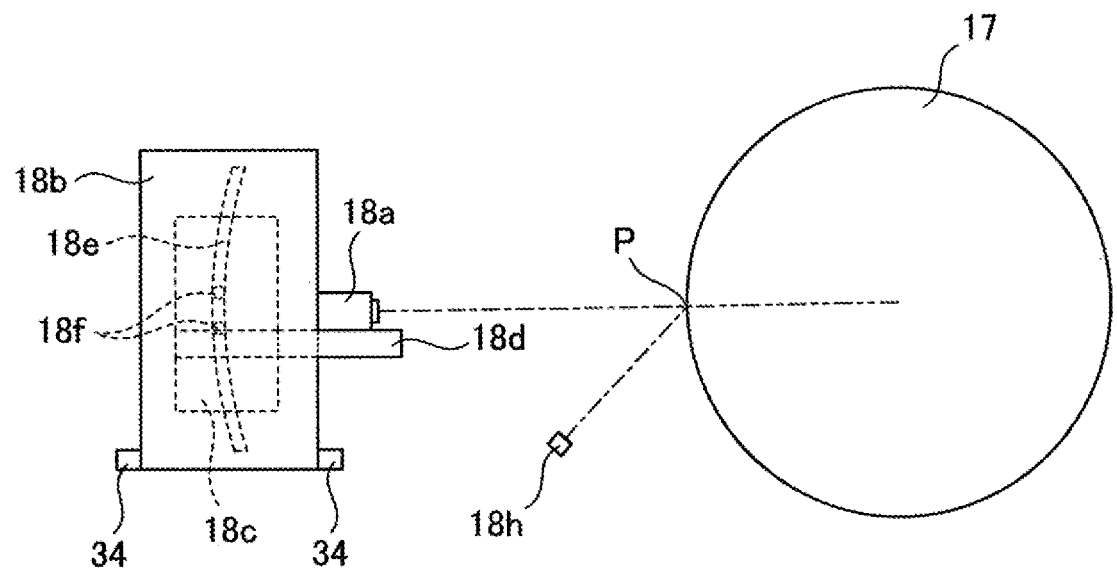
FIG. 4A is a side view illustrating the checking device according to the first embodiment of the present invention.
Figure 4B:
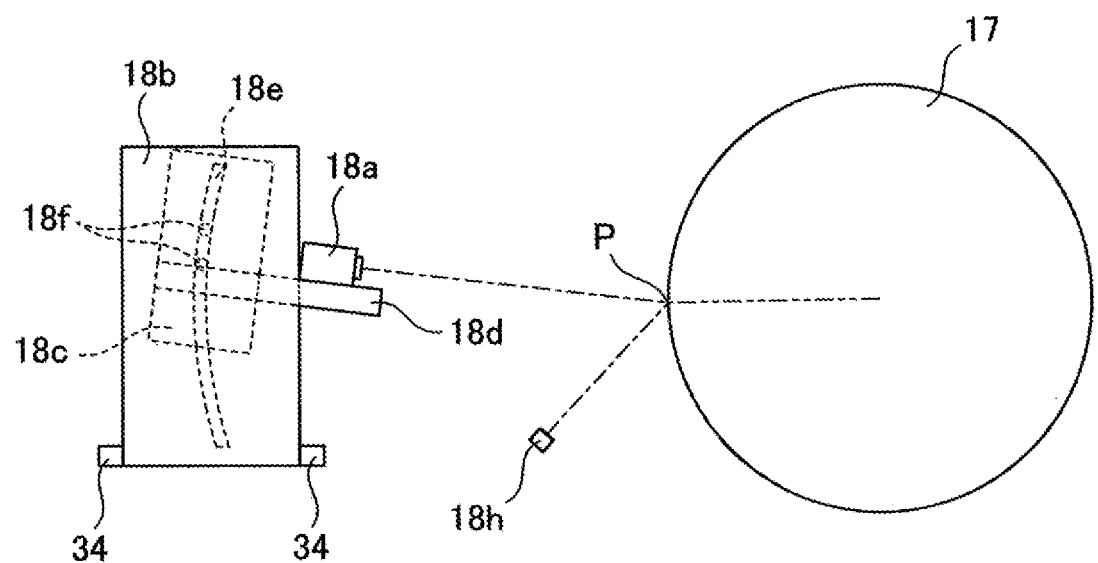
FIG. 4B is a side view illustrating the checking device according to the first embodiment of the present invention.
Figure 5:
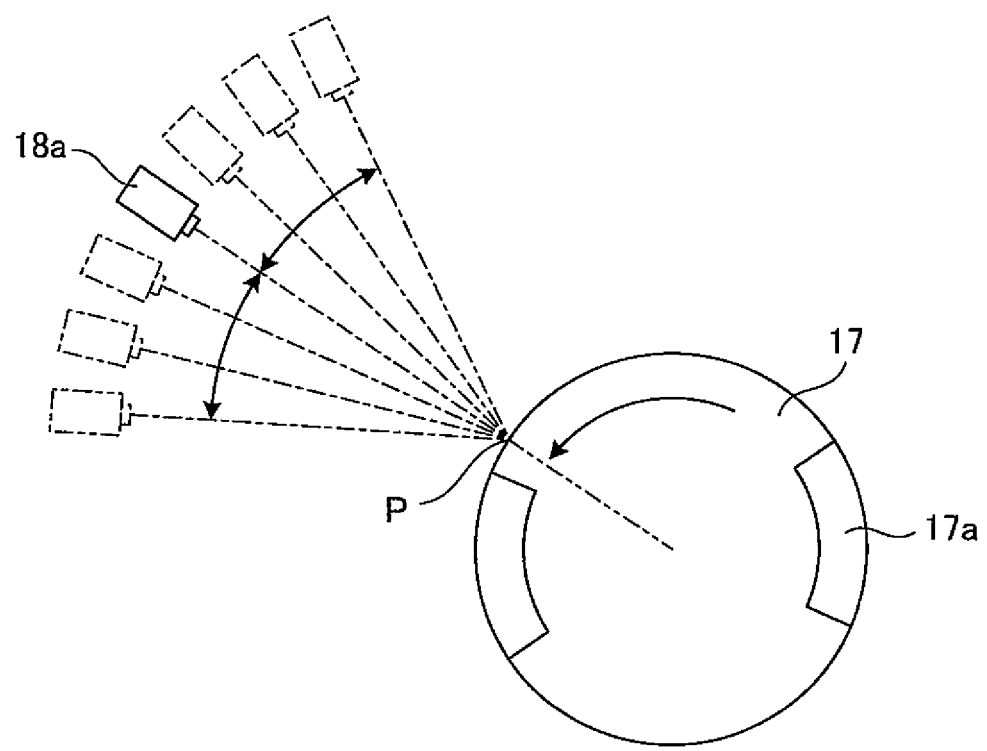
FIG. 5 is a diagram explaining movement of a checking camera according to the first embodiment of the present invention.

As illustrated in FIGS. 3, 4A and 4B, in the checking device 18 in this embodiment, the checking camera 18a is supported on a support plate 18d. Guide members 18c are fixed to the opposite sides of the support plate 18d in the axial direction of the checking cylinder 17, respectively, and the two guide members 18c are swingably supported on guide plates 18b, respectively.

Specifically, two guide pins 18f are fixed to each of the two guide members 18c on the same arc centered at the detection point P, and these guide pins 18f project toward the respective guide plates 18b.

Moreover, the two guide plates 18b are provided with arc-shaped guide holes 18e centered at the detection point P. By engaging the guide pins 18f with the guide holes 18e and moving the guide members 18c to slide the guide pins 18f along the guide holes 18e, it is possible to swing the checking camera 18a along the arc centered at the detection point P with the support plate 18d while keeping the checking camera 18a in focus at the detection point P, as illustrated in FIG. 5.

Note that the guide plates 18b are fixed to two frames 34 extending in the axial direction of the checking cylinder 17. Also, the light source 18h is installed so as to apply light to the detection point P.

The data of an image captured by the checking camera 18a is inputted into a printing-quality checking unit 18g and compared with the data of a reference image by the printing-quality checking unit 18g to check the printing quality.

Figure 6:
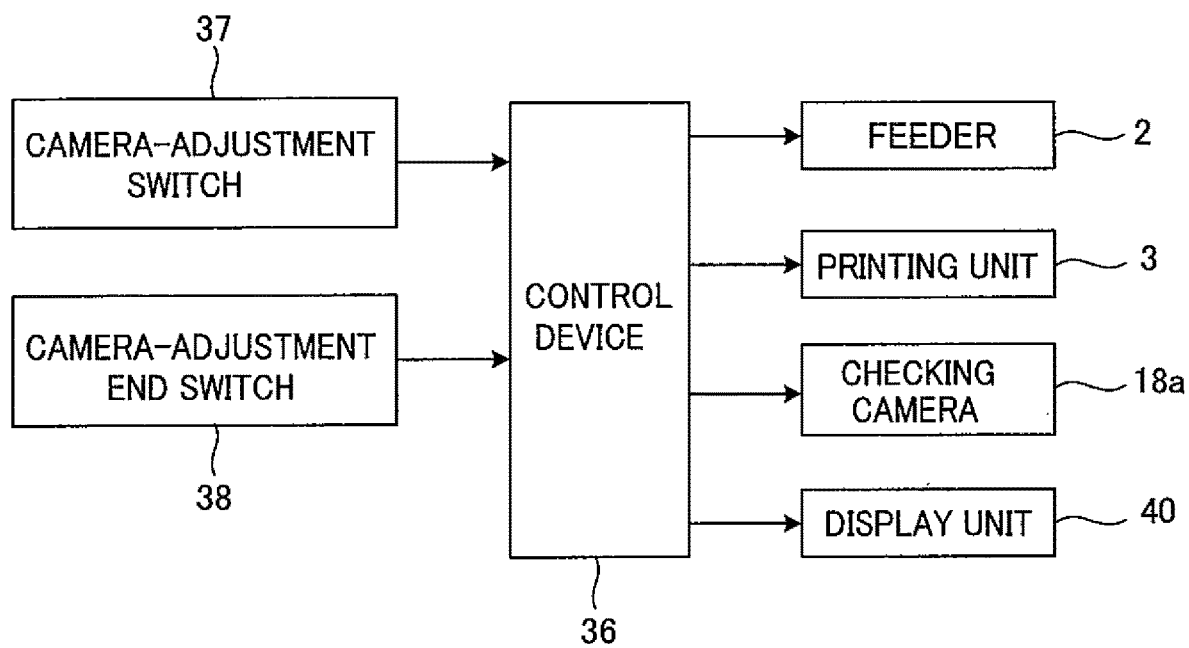
FIG. 6 is a block diagram illustrating a control configuration for printing quality checking according to the first embodiment of the present invention.

Next, camera-angle adjustment control in this embodiment will be described using FIG. 6. In FIG. 6, reference numeral 36 denotes a control device. Also, reference numeral 37 denotes a camera-adjustment switch operated when the position of the checking camera 18a is adjusted. Reference numeral 38 denotes a camera-adjustment end switch operated when the positional adjustment of the checking camera 18a is ended.

Upon input of an ON signal from the camera-adjustment switch 37, the control device 36 outputs a feed start command to the feeder 2, outputs a printing start command to the printing unit 3, outputs an imaging command to the checking camera 18a, and outputs an image display command to a display unit 40. Consequently, number printing is performed on a sheet 5, the checking camera 18a images the sheet 5, and the display unit 40 displays the image captured by the checking camera 18a.

Also, upon input of an ON signal from the camera-adjustment end switch 38, the control device 36 outputs a feed end command to the feeder 2, outputs a printing end command to the printing unit 3, and outputs an imaging end command to the checking camera 18a. Consequently, the number printing on sheets 5 and the imaging of sheets 5 by the checking camera 18a end.

In this embodiment as described above, each sheet 5 is a printed product, the checking camera 18a is imaging means, the light source 18h is a light source, the printing-quality checking unit 18g is printing-quality checking means, the support plate 18d, the guide members 18c, and the guide pins 18f are a support member, and the guide plates 18b and the guide holes 18e are a guiding member.

The procedure of the printing quality checking by the control device 36 will now be described briefly by using FIG. 7.

Figure 7:
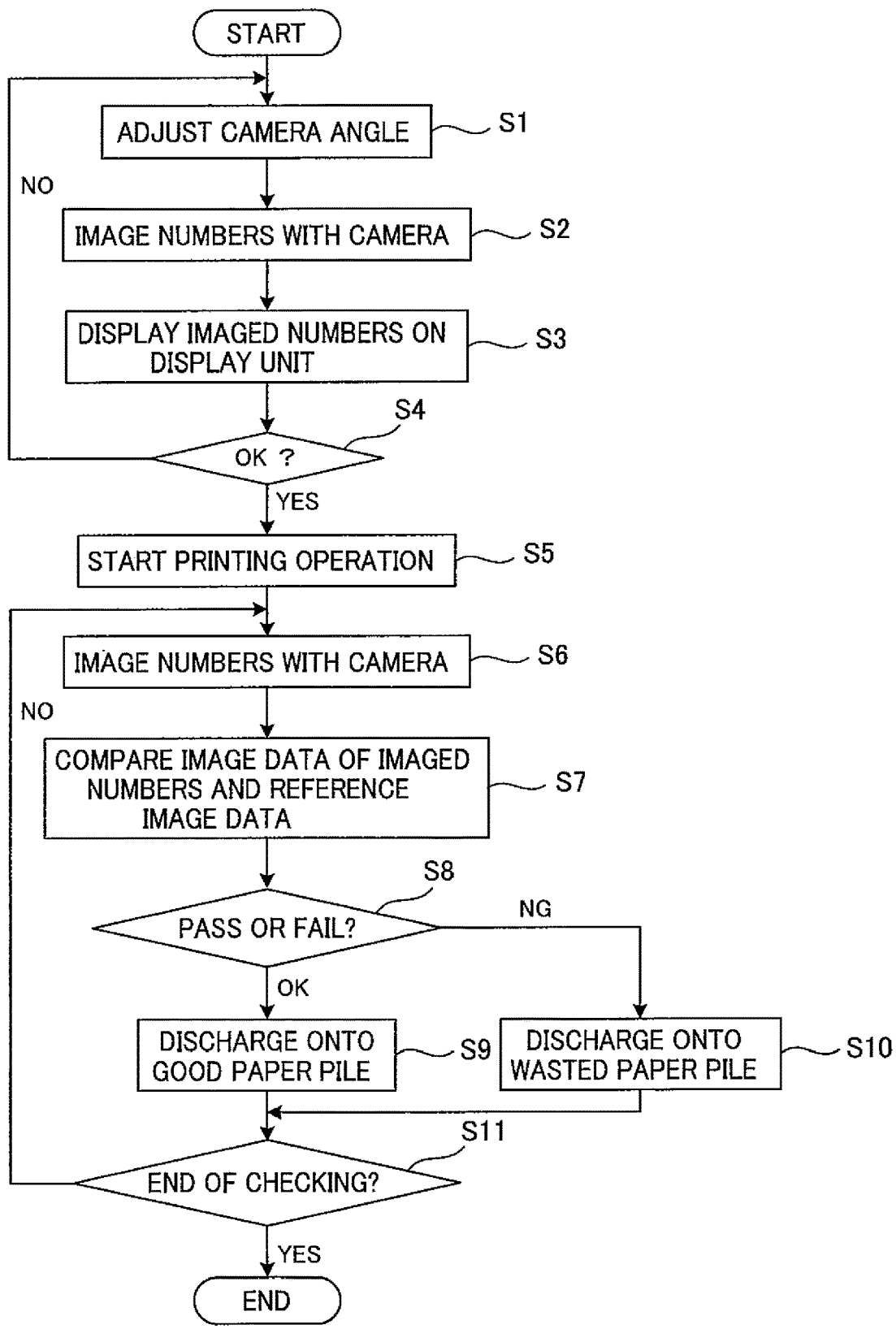
FIG. 7 is a flowchart explaining the procedure of the printing quality checking according to the first embodiment of the present invention.

As illustrated in FIG. 7, the guide members 18c are slid relative to the guide plates 18b with the guide pins 18f engaged with the guide holes 18e to adjust the position (imaging angle) of the checking camera 18a (step S1). Then, the numbers printed on a sheet 5 are imaged with the checking camera 18a (step S2). The image captured by the checking camera 18a is displayed on the display unit 40 (step S3).

Then, whether or not the numbers are readable is determined from the image displayed on the display unit 40 (step S4). If the image displayed on the display unit 40 is in a state where the light from the specular reflection member 5a is excessively intense and makes the diffuse-reflected patterns (numbers) unreadable, as illustrated in FIG. 8B, in step S4 (NO), the processing returns to the process in step S1. On the other hand, if the image displayed on the display unit 40 is in a state where the ratio between the intensity of light from the specular reflection member 5a and the intensity of light from the diffuse-reflected patterns (numbers) is well balanced and the numbers are readable, as illustrated in FIG. 8A, (YES), a printing operation is started (step S5).

If a printing operation is started in step S5, the numbers are imaged with the checking camera 18a (step S6). The image data of the imaged numbers and the reference image data are compared with each other (step S7) to determine whether or not the printing quality of the seal and numbers printed on the sheet 5 is good, and whether or not the printed numbers match the numbers that are supposed to be printed (step S8). If the seal and numbers are determined to be normal (PASS), the sheet 5 is discharged onto a good paper pile (step S9). If the seal and/or numbers are determined to be abnormal (FAIL), the sheet 5 is discharged onto a wasted paper pile (step S10).

The above-described processes in and after step S6 are repeated until the printing operation ends (step S11).

The printing-quality checking device according to this embodiment with the above configuration allows adjustment of the position of the checking camera 18a relative to the normal line connecting the center of the checking cylinder 17, which supports a sheet 5, and the detection point P for imaging of the sheet 5 by the checking camera 18a, along an arc centered at the detection point P (adjustment of the imaging angle of the checking camera 18a while keeping it in focus at the detection point P). In this way, it is possible to adjust the ratio between the intensity of light from the specular reflection member 5a and the intensity of light from the pattern (number) portions printed on the specular reflection member 5a in the image captured by the checking camera 18a. Hence, the sheet 5 with the specular reflection member 5a provided thereto can be reliably checked for the printing quality of the patterns (numbers) printed on this specular reflection member 5a.

Note that, although the single numbering and imprinting machine 1 is configured to include both the seal cylinder 13 for printing a seal and the number cylinders 14, 15 for printing numbers in this embodiment, a configuration with only a seal cylinder or only a number cylinder may also be employed. Also, the checking cylinder 17 is a double-size cylinder, it may be a single-size cylinder or a triple-size cylinder in accordance with the performance of the checking camera 18a.

Also, although an example in which the position of the checking camera 18a is adjusted using the support plate 18d and the guide plates 18b has been presented in this embodiment, the means for adjusting the position of the checking camera 18a is not limited to the above example but may be any means as long as it can adjust the position of the checking camera 18a along an arc centered at the detection point P.

Second Embodiment

A second embodiment of the printing-quality checking device according to the present invention will be described based on FIGS. 9 to 11.

Unlike the printing-quality checking device according to the first embodiment, the printing-quality checking device according to this embodiment is configured such that the position of the checking camera 18a is fixed and the position of the light source 18h is adjustable.

Specifically, in this embodiment, the checking device 18 is configured such that the light application angle to the detection point P is changed by adjusting the position of the light source 18h to thereby enable adjustment of the ratio between the intensity of specularly reflected light from the specular reflection member 5a of a sheet 5 and the intensity of diffuse-reflected light from the pattern portions (numbers in this embodiment) printed on the specular reflection member 5a, which are imaged by the checking camera 18a. Note that the position of the checking camera 18a is fixed.

The other features of the configuration are basically similar to those in the first embodiment. In the following, members that function similarly to members described in the first embodiment will be denoted by the same reference numerals, and repetitive description thereof will be omitted. The difference will be mainly described.

Figure 9:
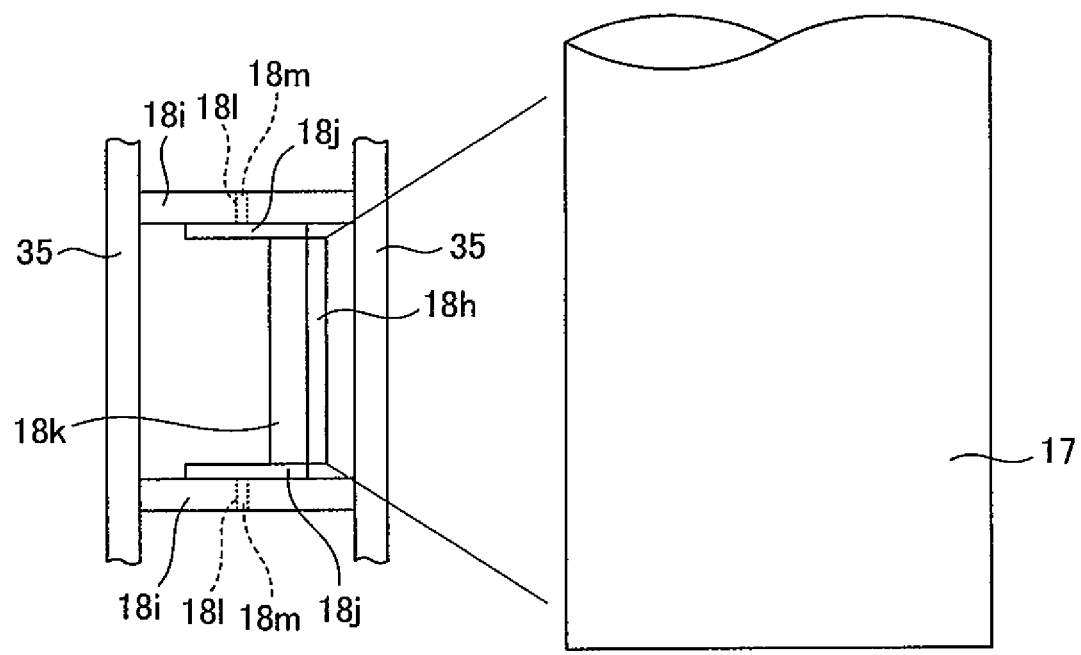
FIG. 9 is a top view illustrating a checking device according to a second embodiment of the present invention.
Figure 10A:
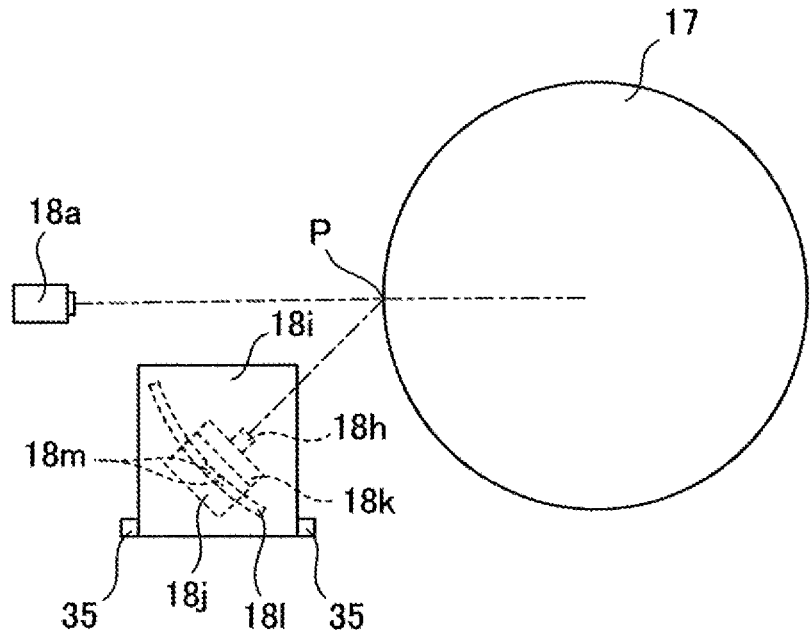
FIG. 10A is a side view illustrating the checking device according to the second embodiment of the present invention.
Figure 10B:
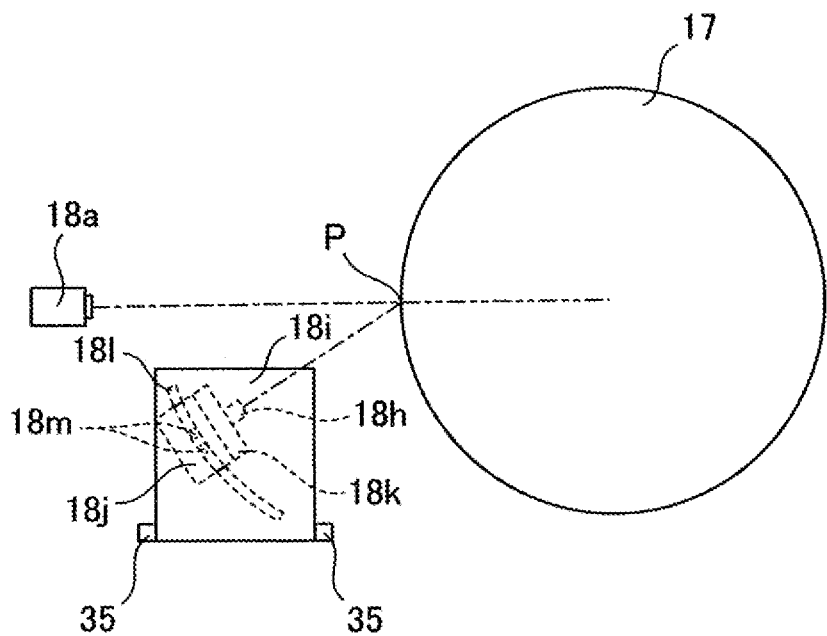
FIG. 10B is a side view illustrating the checking device according to the second embodiment of the present invention.

As illustrated in FIGS. 9, 10A and 10B, in the checking device 18 in this embodiment, the light source 18h is supported on a support plate 18k. Two guide members 18j are fixed to the opposite sides of the support plate 18k in the axial direction of the checking cylinder 17, respectively, and the two guide members 18j are swingably supported on two guide plates 18i, respectively.

Specifically, two guide pins 18m are fixed to each of the two guide members 18j on the same arc centered at the detection point P, and these guide pins 18m project toward the respective guide plates 18i.

Moreover, the two guide plates 18i are provided with arc-shaped guide holes 18l centered at the detection point P. By engaging the guide pins 18m with the guide holes 18l and moving the guide members 18j to slide the guide pins 18m along the guide holes 18l, it is possible to swing the light source 18h along the arc centered at the detection point P with the support plate 18k while keeping the light application direction of the light source 18h pointing at the detection point P.

Note that the guide plates 18i are fixed between two frames 35 extending in the axial direction of the checking cylinder 17.

In this embodiment as described above, each sheet 5 is a printed product, the checking camera 18a is imaging means, the light source 18h is a light source, the printing-quality checking unit 18g is printing-quality checking means, the support plate 18k, the guide members 18j, and the guide pins 18m are a support member, and the guide plates 18i and the guide holes 18l are a guiding member.

The procedure of the printing quality checking by the control device 36 will now be described briefly by using FIG. 11.

Figure 11:
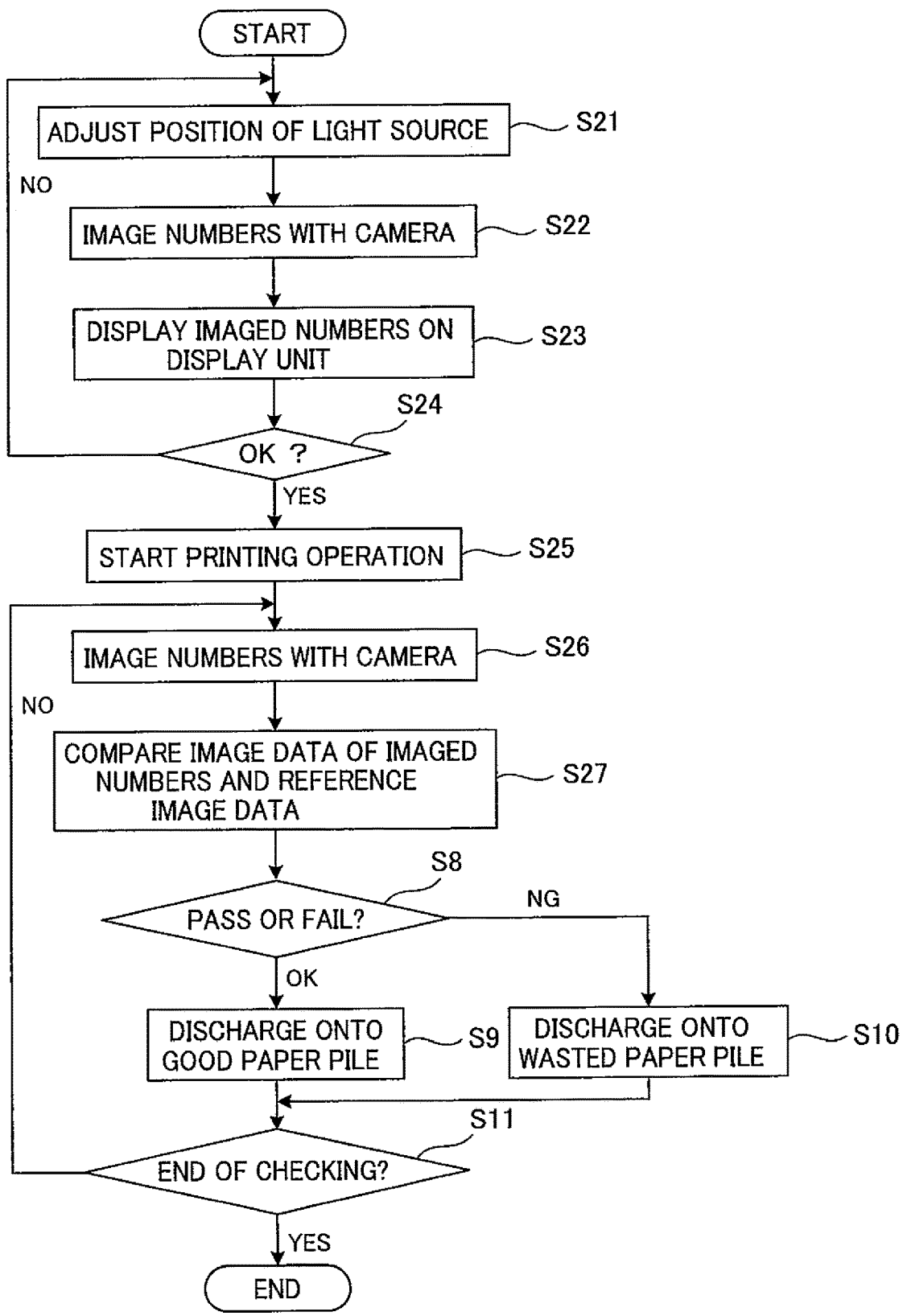
FIG. 11 is a flowchart illustrating the procedure of printing quality checking according to the second embodiment of the present invention.

As illustrated in FIG. 11, the guide members 18j are slid relative to the guide plates 18i with the guide pins 18m engaged with the guide holes 18l to adjust the position (light application angle) of the light source 18h (step S21). Then, the numbers printed on a sheet 5 are imaged with the checking camera 18a (step S22). The image captured by the checking camera 18a is displayed on the display unit 40 (step S23).

Then, whether or not the numbers are readable is determined from the image displayed on the display unit 40 (step S24). If the image displayed on the display unit 40 is in a state where the light from the specular reflection member 5a is excessively intense and makes the diffuse-reflected patterns (numbers) unreadable, as illustrated in FIG. 8B, in step S24 (NO), the processing returns to the process in step S21.

Figure 8A:
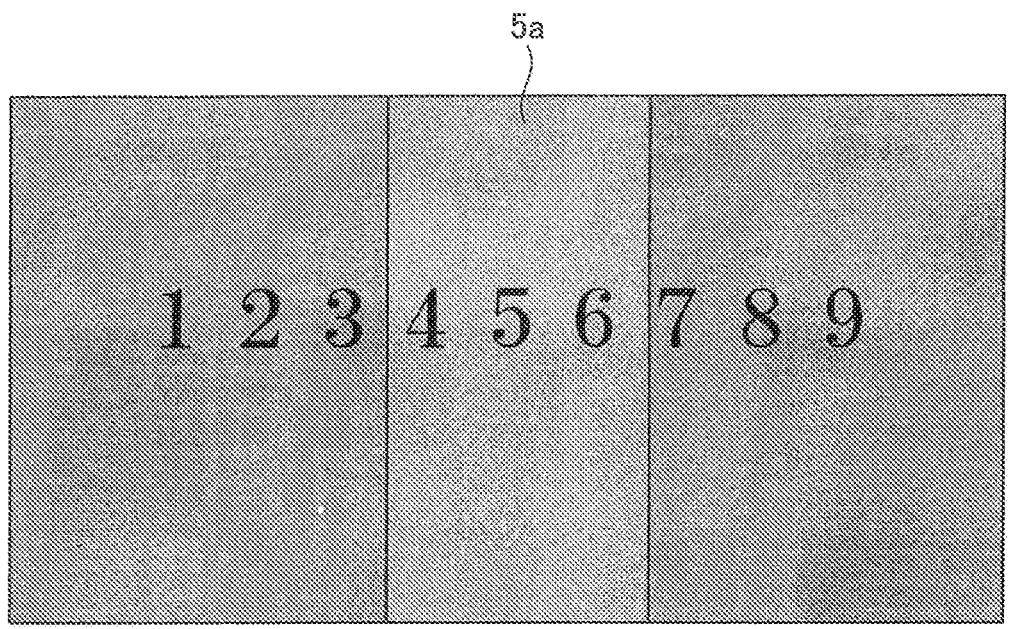
FIG. 8A is an explanatory view illustrating an example image captured by the checking camera according to the first embodiment of the present invention.
Figure 8B:
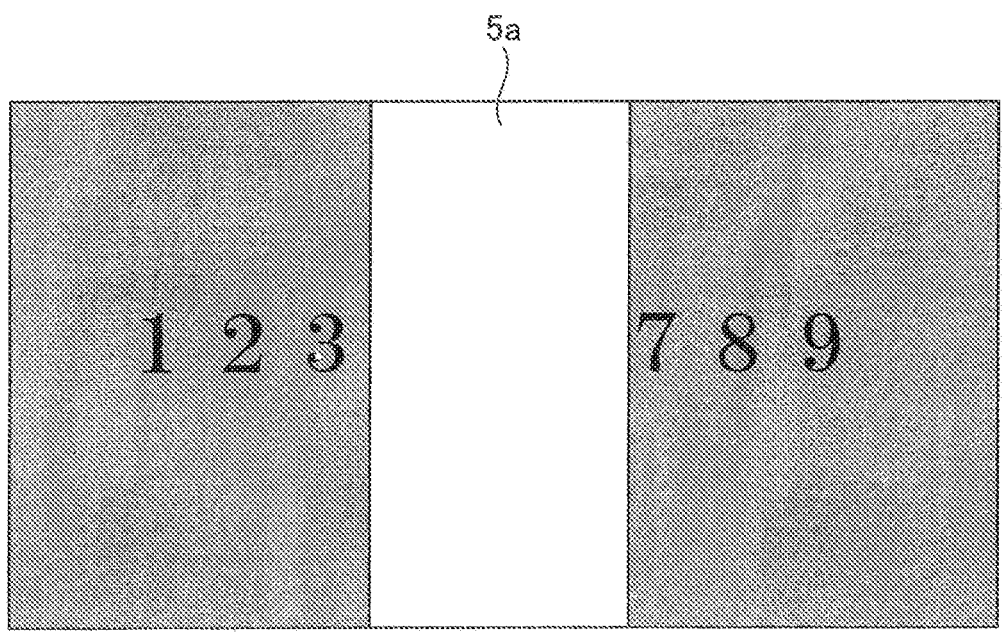
FIG. 8B is an explanatory view illustrating another example image captured by the checking camera according to the first embodiment of the present invention.

On the other hand, if the image displayed on the display unit 40 is in a state where the ratio between the intensity of light from the specular reflection member 5a and the intensity of light from the diffuse-reflected patterns (numbers) is well balanced and the numbers are readable, as illustrated in FIG. 8A, (YES), a printing operation is started (step S25).

If a printing operation is started in step S25, the numbers are imaged with the checking camera 18a (step S26). The image data of the imaged numbers and the reference image data are compared with each other (step S27) to determine whether or not the printing quality of the seal and numbers printed on the sheet 5 is good, and whether or not the printed numbers match the numbers that are supposed to be printed (step S28). If the seal and numbers are determined to be normal (PASS), the sheet 5 is discharged onto a good paper pile (step S29). If the seal and/or numbers are determined to be abnormal (FAIL), the sheet 5 is discharged onto a wasted paper pile (step S30).

The above-described processes in and after step S26 are repeated until the printing operation ends (step S31).

The printing-quality checking device according to this embodiment with the above configuration allows adjustment of the position of the light source 18h along an arc centered at the detection point P (adjustment of the light application angle of the light source 18h about the detection point P while keeping its light application direction pointing at the detection point P). In this way, it is possible to adjust the ratio between the intensity of light from the specular reflection member 5a and the intensity of light from the pattern (number) portions printed on the specular reflection member 5a in the image captured by the checking camera 18a. Hence, the sheet 5 with the specular reflection member 5a provided thereto can be reliably checked for the printing quality of the patterns (numbers) printed on this specular reflection member 5a.

In the above first and second embodiments, an example has been presented in which the position of either the checking camera 18a or the light source 18h is adjusted to adjust the ratio between the intensity of specularly reflected light from the specular reflection member 5a of a sheet 5 and the intensity of diffuse-reflected light from the pattern portions printed on the specular reflection member 5a, which are imaged by the checking camera 18a. Note, however, that the present invention is not limited to the above embodiments. For example, the positions of both the checking camera 18a and the light source 18h may be adjusted to adjust the ratio between the intensity of specularly reflected light from the specular reflection member 5a of a sheet 5 and the intensity of diffuse-reflected light from the pattern portions (numbers in this embodiment) printed on the specular reflection member 5a, which are imaged by the checking camera 18a.

INDUSTRIAL APPLICABILITY

The present invention is applicable to a printing-quality checking device for checking the printing quality of a pattern printed on a specular reflection member provided to a printed product.

EXPLANATION OF REFERENCE NUMERALS 1 numbering and imprinting machine
2 feeder
3 printing unit
4 delivery unit
5 sheet
5a specular reflection member
12 impression cylinder
13 seal cylinder
14 first number cylinder
15 second number cylinder
16 transfer cylinder
17 checking cylinder
18 checking device
18a checking camera
18b guide plate
18c guide member
18d support plate
18e guide hole
18f guide pin
18g printing-quality checking unit
18h light source
18i guide plate
18j guide member
18k support plate
18l guide hole
18m guide pin
23 delivery chain
24 delivery gripper
25A first discharge-cam moving device
25B second discharge-cam moving device
27A first delivery cam
27B second delivery cam
30 fixed cam
31 first delivery pile
32 second delivery pile
33 third delivery pile
34, 35 frame
36 control device
37 camera-adjustment switch
38 camera-adjustment end switch
40 display unit
P detection point

The invention claimed is:

1. A printing-quality checking device provided to a printing press including a printing unit that performs printing on a specular reflection member provided to a printed product, the printing-quality checking device including:
a light source that applies light to the printed product;
an imaging device that images a pattern printed on the printed product; and
a printing-quality checking unit that checks quality of the pattern printed by the printing unit, based on image data captured by the imaging device,
the printing-quality checking device characterized in that the imaging device or the light source is supported to be movable along an arc centered at a detection point on the printed product imaged by the imaging device.

2. The printing-quality checking device according to claim 1, wherein the printing-quality checking device further comprises:
a support member that supports the imaging device or the light source; and
a guiding member that guides the support member along the arc.

3. The printing-press printing-quality checking device according to claim 2, wherein
the support member includes
a support plate which supports the imaging device or the light source, and guide members which are fixed to axially opposite sides of the support plate and to each of which two guide pins are fixed on a same arc centered at the detection point, the guiding member includes two guide plates each of which includes an arc-shaped guide hole centered at the detection point, and the imaging device or the light source moves along the arc centered at the detection point with the guide members and the support plate by allowing the guide pins to slide along the guide holes.

* * * * *